E. E. HANS.
FILTERING MEANS FOR LUBRICATING SYSTEMS.
APPLICATION FILED APR. 19, 1920.
1,379,259.
Patented May 24, 1921.
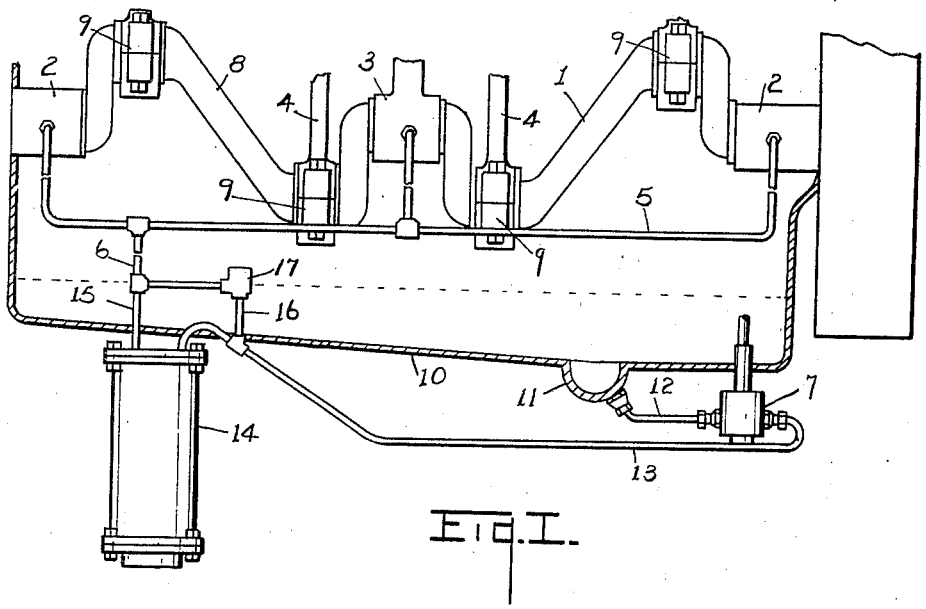
Fig. I.
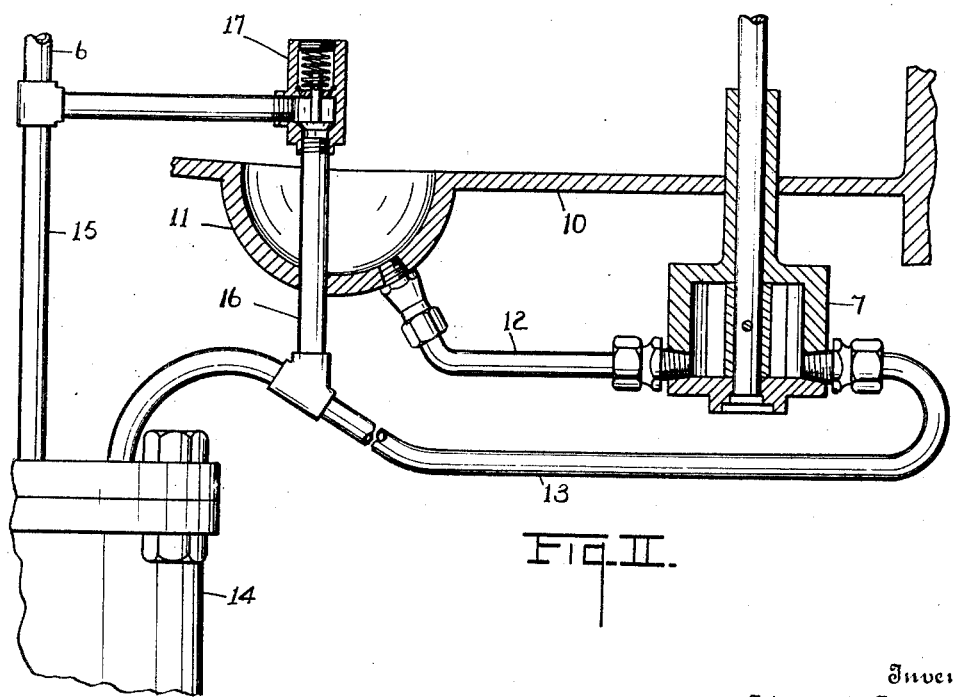
Fig. II.
Inventor
Edmund E. Hans
Witnesses

UNITED STATES PATENT OFFICE.

EDMUND E. HANS, OF KALAMAZOO, MICHIGAN.

FILTERING MEANS FOR LUBRICATING SYSTEMS.

1,379,259.   Specification of Letters Patent.   Patented May 24, 1921.

Application filed April 19, 1920. Serial No. 375,033.

*To all whom it may concern:*

Be it known that I, EDMUND E. HANS, a citizen of the United States, residing at Kalamazoo, county of Kalamazoo, Michigan, have invented certain new and useful Improvements in Filtering Means for Lubricating Systems, of which the following is a specification.

This invention relates to improvements in filtering means for lubricating systems.

The main object of this invention is to provide an improved and very simple filtering means for lubricating systems which practically removes foreign matter from the lubricant, the same being well adapted to automobiles and tractor engines.

Objects relating to details of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming part of this specification, in which:

Figure I is a detail view, partially in vertical section, of an internal combustion engine structure embodying the features of my invention.

Fig. II is an enlarged detail section, partially in vertical section, through the pump and sump, the piping being in broken sections.

In the drawing similar numerals of reference refer to similar parts throughout the several views.

Referring to the drawing, I have illustrated various parts in conventional form, as the structural details form no part of this invention. I have shown my improvements embodied in an internal combustion engine, only such portions thereof being shown as I deem necessary to illustrate an adaptation of my improvements.

The crank shaft 1 is supported by bearings 2, 2 and 3, and has pitman rods 4 connected thereto in the usual or desired manner, the shaft illustrated being a four-throw shaft. Lubricant is conducted to the bearings 2, 2, 3 by means of the pipe 5 connected to the supply pipe 6 from the filter 14.

In the embodiment shown in Fig. I, the crank has a longitudinal lubricant passage 8 therein providing conduits leading from the bearings 2 and 3 to the pitman bearings 9. The crank case 10 is adapted as a lubricant reservoir and to receive the lubricant escaping from the bearings lubricated. The crank case is provided with a sump or well 11.

The pipe 12 leads from the sump 11 to the intake of the pump 7, which discharges through pipe 13 to the filter 14, lubricant delivering from the filter 14 to the pipe 15 to the supply pipe 6. A by-pass 16 connects from the pipe 13 to the pipe 6 and contains a spring loaded valve 17 which is adjustable to any desired pressure. The pump 7 is of course driven by any suitable connection to the engine, not necessary to be shown.

In operation oil is taken from the sump 11 and delivered ordinarily by gear force pump 7 to the filter 14, and the filtered oil passes out through the pipe 15 and pipe 6 to supply the bearings 2, 2, 3. If the filter becomes clogged or in any way overworked, the spring loaded valve 17 will be opened and the lubricant will be by-passed directly from the pump 7 to the bearings to be lubricated. Also, if the engine is running at high speed and requires an extra amount of lubricant, the spring loaded valve will open and permit the lubricant to pass. The engine and other parts, however, will operate at moderate speed, as in starting and stopping and the like, to such an extent that all solids and foreign matter will be passed from the sump into the filter, so that the result of this arrangement is that an extra supply of clean oil can be delivered, because it is only necessary that the small quantity of dirty oil that collects in the sump be actually filtered.

Having thus described my invention what I claim as new and desire to secure by Letters Patent is:

1. In a lubricating system for internal combustion engines, the combination with the parts to be lubricated, of a crank case constituting an oil reservoir adapted to receive the lubricant escaping from such lubricated parts, a sump, a filter, a pump with its intake connected to the sump and delivering to the said filter, a lubricant supply pipe from said filter to the parts to be lubricated, a by-pass from the delivery pipe of said pump to the said lubricant supply pipe, and a spring loaded valve in the said by-pass, whereby the by-pass operates automatically under abnormal pressure.

2. In a lubricating system for internal combustion engines, the combination with the parts to be lubricated, of a crank case constituting an oil reservoir adapted to receive the lubricant escaping from such lubricated parts, a sump, a filter, a pump with its intake connected to the sump and delivering to the said filter, a lubricant supply pipe from said filter to the parts to be lubricated, and a by-pass from the delivery pipe of said pump to the said lubricant supply pipe, means to open said by-pass automatically under abnormal pressure as specified.

In witness whereof I have hereunto set my hand and seal in the presence of two witnesses.

EDMUND E. HANS. [L. S.]

Witnesses:
LUELLA G. GREENFIELD,
MARGARET L. GLASGOW.